July 26, 1960 W. B. WADSWORTH ET AL 2,946,862

EAR PROTECTOR AND COMMUNICATION EQUIPMENT

Filed March 21, 1955

INVENTORS
WILLIAM B. WADSWORTH
FORREST R. POOLE

BY Charles R. Fay

ATTORNEY

United States Patent Office 2,946,862
Patented July 26, 1960

2,946,862

EAR PROTECTOR AND COMMUNICATION EQUIPMENT

William B. Wadsworth, Concord, and Forrest R. Poole, Worcester, Mass., assignors to David Clark Company Incorporated, Worcester, Mass., a corporation of Massachusetts Filed Mar. 21, 1955, Ser. No. 495,394

12 Claims. (Cl. 179—182)

Reference is made to our copending application Serial No. 449,682 filed August 13, 1954, the present invention relating to an improvement thereon.

The principal object of the present invention relates to an improvement in ear protectors having the objects of the avoidance of the use of any kind of ear plug and the provision of an "ear muff" type of ear protector providing for increased attenuation of sound, particularly in the lower frequencies, wherein attenuation of sound at all frequencies is maintained or increased, so that the user is protected against the effects of noise without the necessity for using the relatively injurious ear plug or the like; and the provision of an ear protector as above described in which is incorporated communication equipment including a transducer for converting energy both from sound to electric and electric to sound for two-way communication by means of the same ear protector, without any external microphone, by sound waves radiating through the head of the user from the mouth to the ear, the present ear protector having such a high efficiency in cutting out circumambient sound from the ear of the user that communication equipment for sending messages may be utilized within the ear protector, as well as receiving equipment, and to this end transducer means is used for sound communication in either direction.

Other objects and advantages of the invention will appear hereinafter, including the use of a single means for the two-way communication, and the use of a separate receiver and microphone in either or both ear protectors.

Reference is to be had to the accompanying drawings, in which

Figure 1:
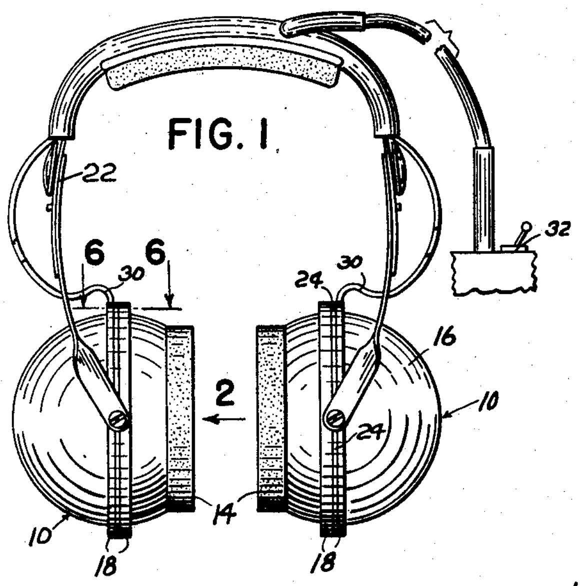
Fig. 1 is a view in elevation illustrating the invention.
Figure 2:
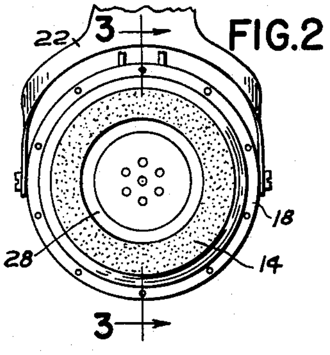
Fig. 2 is a view in elevation, looking in the direction of arrow 2 in Fig. 1.
Figure 3:
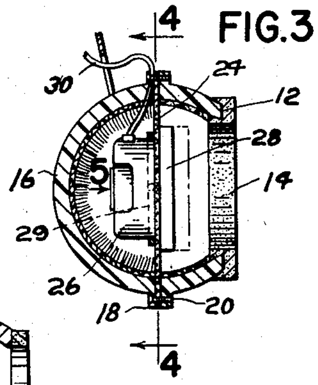
Fig. 3 is a section on line 3—3 of Fig. 2.
Figure 4:
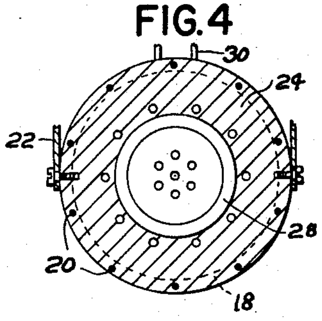
Fig. 4 is a section on line 4—4 of Fig. 3.

With reference to the ear protector disclosed herein, the same comprises a shell generally indicated at 10 which is in the form of a sphere although it may be spheroidal or ellipsoid in shape, and this device has a segment removed therefrom at a side thereof to provide an opening into which the ear extends as is indicated by the reference numeral 12 in Fig. 3. This opening is preferably surrounded by a comfortable, relatively-soft, band 14 which contacts the head about the ear.

As a practical embodiment of the invention, the shell 10 is preferably made in two parts, one of which is hemispherical as indicated by the numeral 16, and the other of which, containing the opening 12, is of similar shape except for the opening. The part 16 is illustrated as lined with soft sound-deadening material which may be used if desired, see Fig. 3. These two parts may be conveniently joined by any means such as cementing the same together, but it is preferred that flanges 18 shall be provided on each member and these flanges are then secured together by cementing or by fasteners indicated at 20.

There are two of these devices arranged in the form of a headset as indicated at 22, so that the same may be applied to the ears of the user in the manner of earphones. The advantages of the spheroidal construction have been fully set forth in the copending application above identified, so it is believed that no further description of the ear protector itself is necessary.

The communication equipment is applied to the ear protectors conveniently by means of a disc 24 which may be made of leather or the like and is fixed between the flanges 18 and between the corresponding edges of the two parts of the device explained above. The transducer may be a commercial telephone receiver-transmitter, and is generally indicated at 26. This comprises a container for the working parts thereof, the same being well known in the art and not requiring any further description here.

The casing 26 is provided with a flange 28 which is larger than the more or less central opening in the leather diaphragm 24, and the major portion of the transducer extends to the hemispherical side of the ear protector (see Fig. 3), where it is positioned away from the ear of the user which extends through the band 14. A relatively simple retaining ring 29 may be utilized to hold the device 26 to the leather disc without in any way touching the shell itself.

Figure 6:
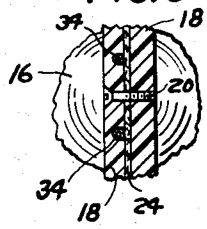
Fig. 6 is an enlarged section on line 6—6 of Fig. 1.

The necessary wires for the transducer are shown at 30 and these may be provided with a convenient switch-over 32. The wires may conveniently be entered into the shell through small notches made in the flange 18 and shown at 34 in Fig. 6, whereby these wires are firmly secured in position as will be apparent.

In the use of the device, the same is applied to the head as will be clear, with the ears of the user extending through the openings of the shells thereinto into close proximity but not necessarily touching the member 28. The transducer may be in the form of a conventional receiver, in which case intelligence is received by electric energy through wire 30 and is transformed into sound energy by the conventional receiver mechanism.

On the other hand, it has been found that speech energy not only radiates from the mouth of an individual, but also is conducted by various means through the head itself interiorly. Some of this speech energy is utilized by the present device to energize the receiver at 26 so as to be changed into electrical energy to carry the intelligence to a remote point using the receiver as a transducer.

The present ear protector greatly reduces the sound of speech radiated from the mouth and all other ambient noises are greatly reduced also. Speech energy is nevertheless located at the interior of the ear muff or shell of the present construction because of the internal sound conducting paths in the head of the user. The energy transduced by the receiver 28 thus has primarily the speech energy of the person and intelligent voice signals may be heard in this manner using the receiver as a microphone.

Figure 7:
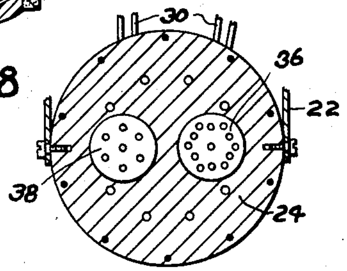
Fig. 7 is a view similar to Fig. 4 illustrating a modification.
Figure 5:
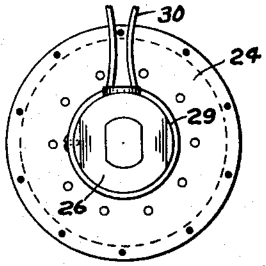
Fig. 5 is a view in elevation of the mounting for the transducer, looking in the direction of arrow 5 in Fig. 3.

The device may be improved by using an actual microphone as indicated at 36 in Fig. 7, together with a typical receiver 38, or a receiver may be located in one of the shells 10 and a typical microphone in the other, but in any event two-way communication is thus provided but only because of the extreme sound attenuating efficiency of the ear muff of the present invention.

In all devices known in the prior art, high emanating noise fields completely obviate the efficiency of sound conduction through the ear canals since although the sound waves are present, they cannot overcome even normal ambient noises encountered, but with the novel ear protector the extraneous noises are cut out to such an extent that the present invention is practical and operates in the manner described, and as an example using this invention, an intelligible voice signal has been heard from the internal microphone in an ambient white noise field of 127 decibels, a feat hitherto impossible.

Figure 8:
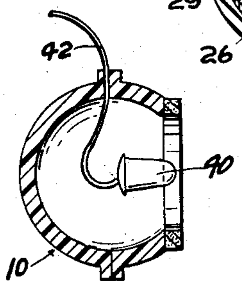
Fig. 8 is a section similar to Fig. 3 but showing a modification.

In Fig. 8 there is shown a modified form of sound energy transducer. The element 40 represents in general a conventional insert type earphone or sound transfer device such as for instance in the usual hearing aid or the like, and this fits into the ear canal of the user and is connected by wire 42 similarly to wire 30 for external communication in both directions as explained above with reference to the transducer 26.

Having thus described our invention and the advantages thereof, we do not wish to be limited to the details herein disclosed, otherwise than as set forth in the claims, but what we claim is:

1. The combination of an ear protector comprising a shell to be applied to the head of the user and surrounding the ear, with a transducer for the communication of sound within the shell to an exterior point with the shell applied to the head of the user.

2. The combination of an ear protector comprising a shell to be applied to the head of the user and surrounding the ear, with a transducer for the communication of sound within the shell to an exterior point by means of electrically energized wire leading from the transducer to a receiver, said shell being applied to the head of the user.

3. The combination of an ear protector comprising a shell to be applied to the head of the user and surrounding the ear, with a transducer for the communication of sound within the shell to an exterior point and the communication of sound from an exterior point to the ear of the user, the shell being closed by the head of the user.

4. The combination with an ear protector in the form of a shell to receive the ear of the user and having a relatively high attenuation of exterior sound waves and ambient noise, of sound transducing means within the shell for communication of sound from the head of the user through the shell to an exterior sound transducing means and from an exterior sound transducing means to the interior of the shell and to the ear of the user.

5. The combination of claim 4 wherein the first-named sound transducing means comprises a diaphragm operative to transduce sound energy in either direction.

6. The combination of claim 4 wherein the first-named sound transducing means is effective to communicate sound energy in either direction.

7. The combination of claim 4 wherein the first-named sound transducing means includes a receiver and a separate transmitter.

8. The combination of an ear protector comprising shells to separately receive the ears of the user, and means to hold the shells to the head of the user, with sound energy transducing apparatus in the shells, said apparatus communicating speech energy from the mouth and radiated only within the head of the user to an external receiver.

9. The combination of an ear protector comprising shells to separately receive the ears of the user, and means to hold the shells to the head of the user, with sound energy transducing apparatus in the shells, said apparatus communicating speech energy radiated within the head of the user to an external receiver and communicating sound energy from an external point to the ears of the user.

10. The combination of claim 9 wherein each sound energy transducing apparatus comprises a diaphragm accomplishing each said communication.

11. The combination of claim 9 wherein the apparatus of one shell is a transmitter and the apparatus of the other shell is a receiver.

12. An ear protector comprising a shell-like member of spheroidal shape having an opening therein to receive the ear of the user, a sound-deadening support in the member spaced from the opening, and a sound energy transducer mounted on the support and out of contact with the member.

References Cited in the file of this patent

UNITED STATES PATENTS

| | | |
|---|---|---|
| 304,843 | Miller | Sept. 9, 1884 |
| 1,367,746 | Kent | Feb. 8, 1921 |
| 2,353,070 | Pitkin | July 4, 1944 |
| 2,485,405 | Olney | Oct. 18, 1949 |
| 2,535,063 | Halstead | Dec. 26, 1950 |
| 2,603,724 | Kettler | July 15, 1952 |
| 2,801,423 | Shaw et al. | Aug. 6, 1957 |

FOREIGN PATENTS

| | | |
|---|---|---|
| 1,011,517 | France | June 24, 1952 |